United States Patent
Cohn

(10) Patent No.: US 9,260,244 B1
(45) Date of Patent: Feb. 16, 2016

(54) WIRELESS VISUALIZATION INTERFACE FOR AUTONOMOUS GROUND VEHICLE SIGNAL COVERAGE

(71) Applicant: Amazon Technologies, Inc., Seattle, WA (US)

(72) Inventor: Jonathan Cohn, Brighton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/497,110

(22) Filed: Sep. 25, 2014

(51) Int. Cl.
| | |
|---|---|
| *G06Q 10/08* | (2012.01) |
| *G06F 17/00* | (2006.01) |
| *G05D 1/00* | (2006.01) |
| *B65G 1/137* | (2006.01) |
| *G06F 3/0484* | (2013.01) |
| *G05D 1/02* | (2006.01) |
| *H04W 28/00* | (2009.01) |
| *H04W 16/20* | (2009.01) |
| *G05B 19/418* | (2006.01) |

(52) U.S. Cl.
CPC .............. *B65G 1/137* (2013.01); *G05D 1/0022* (2013.01); *G05D 1/0297* (2013.01); *G06F 3/0484* (2013.01); *H04W 16/20* (2013.01); *H04W 28/00* (2013.01); *G05B 19/41895* (2013.01); *G05D 2201/0216* (2013.01); *G06Q 10/08* (2013.01)

(58) Field of Classification Search
CPC ... G06Q 10/08; G06Q 10/087; G05D 1/0287; G05D 1/0297; G05D 2201/02016; G05B 19/41895; H04W 28/00; H04W 16/20
See application file for complete search history.

(56) References Cited

U.S. PATENT DOCUMENTS

| | | | |
|---|---|---|---|
| 6,664,925 B1 * | 12/2003 | Moore et al. | 342/451 |
| 7,539,495 B2 * | 5/2009 | Kalika et al. | 455/446 |
| 8,000,276 B2 * | 8/2011 | Scherzer et al. | 370/310.1 |
| 8,280,547 B2 | 10/2012 | D'Andrea et al. | |
| 2002/0035418 A1 * | 3/2002 | Lee | 701/23 |
| 2004/0236547 A1 * | 11/2004 | Rappaport et al. | 703/2 |
| 2012/0143427 A1 | 6/2012 | Hoffman et al. | |
| 2014/0198670 A1 * | 7/2014 | Mahasenan et al. | 370/252 |

\* cited by examiner

*Primary Examiner* — Michael J Zanelli
(74) *Attorney, Agent, or Firm* — Kilpatrick Townsend & Stockton LLP

(57) ABSTRACT

A system for analyzing the network traffic health of an inventory management system that includes an autonomous vehicle and a plurality of access points. The autonomous vehicle interacts with access points in an inventory management system, and network traffic information related to network connectivity between the autonomous vehicle and the access points is obtained. The autonomous vehicle or the access points transmit(s) the network traffic information to a computer system that can generate a graphical user interface that represents the network traffic information for the inventory management system. The network traffic information can include a variety of information about the interactions between autonomous vehicles and access points, such as roam time of the autonomous vehicles between access points as the autonomous vehicles navigate within the inventory management system.

20 Claims, 10 Drawing Sheets

WIRELESS VISUALIZATION INTERFACE FOR AUTONOMOUS GROUND VEHICLE SIGNAL COVERAGE

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, wireless network setup and manpower, can result in lower throughput, unacceptably long response times, an ever-increasing backlog of unfinished tasks, and, in general, poor system performance. Network engineers are increasingly interested in analyzing how wireless network activity performs relative to the floor layout of modern inventory systems. Currently much of the available wireless network activity connectivity information provided to engineers is in hard-to-read formats, and the sheer volume of the data makes it difficult to analyze. Even with the data, it is difficult for engineers to determine where network problems are occurring.

BRIEF DESCRIPTION OF THE DRAWINGS

Various embodiments in accordance with the present disclosure will be described with reference to the drawings, in which.

DETAILED DESCRIPTION

Figure 1:
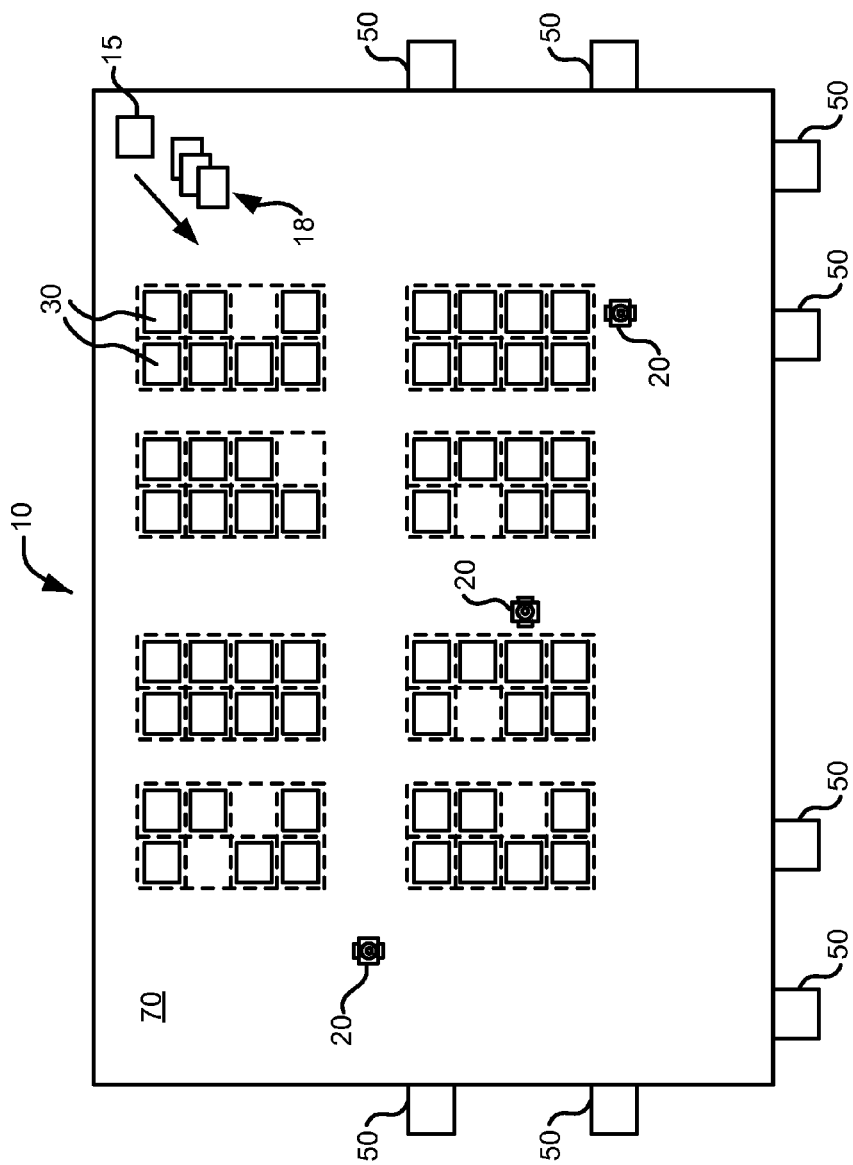
FIG. 1 illustrates components of an inventory management system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. Specifically, systems and methods are provided for an inventory system network traffic feature that, inter alia, manages network traffic information, e.g., wireless traffic information, between mobile drive units and network access points in an inventory system.

In a non-limiting example, an inventory management system may have multiple access points situated in a materials handling facility, e.g., warehouse, distribution center, fulfillment center, etc. It may also have at least one autonomous ground vehicle for receiving and transmitting data about the wireless connectivity between the ground vehicle and the multiple access points. The inventory management system may also have a computer system capable of receiving the network traffic information from the autonomous ground vehicle. The network traffic information may be presented graphically to the user via a graphical user interface (GUI), indicating network signal strength at certain areas of the materials handling facility, long roam times for certain autonomous ground vehicles, and/or unnecessary access points. In accordance with at least one embodiment, the GUI may be updated after receiving input from a user. For example, the user may choose to view data from a certain date range for a particular inventory management system. In another embodiment, the user can utilize the GUI to provide instructions to update configuration settings for the autonomous ground vehicle or network access points within the inventory management system. Alternatively, the configuration settings for the autonomous ground vehicle or network access points may be automatically updated by the inventory management system based on the network traffic information. For example, the computer system associated with the inventory management system may be configured to provide instructions which update the autonomous ground vehicles' traffic paths or to update the signal strength of a particular network access point.

Embodiments of the present disclosure are directed to, among other things, a service implemented by a computer system for obtaining network traffic information regarding interaction between an autonomous vehicle, such as a mobile drive unit, an unmanned aerial vehicle or other autonomous land, water, and/or air-based vehicle, and one or more network access points in an inventory management system. If desired, this information can be provided to a user, such as an administrator of the inventory management system. In embodiments, the inventory management system can utilize the autonomous vehicles to gather and send network traffic information to a computer system associated with an inventory management system network traffic feature or service as described herein. The autonomous vehicles may be located about the inventory management system, for example, in various locations about a materials handling facility. The service may analyze and interpret the network traffic information for presentation in a GUI. The GUI can provide various information about the inventory management system network traffic feature including roaming time, traffic paths of the autonomous vehicles, signal strength of the access points, and/or timeouts associated with the autonomous vehicles. In embodiments, the information provided by the GUI is customizable. For example, the service may receive customization input in the form of queries from a user via the GUI. The service may filter the information provided to the user via the GUI based on the received input and graphically update the GUI presented to the user. In addition, the service can utilize the network traffic information to provide instructions or information to the access points or autonomous vehicles, either automatically or in response to user input, to increase efficiency in the inventory management system.

As used herein, the phrase "access points" includes devices that act as transmitters and receivers of local area wireless network signals (e.g., "Wi-Fi", Long Term Evolution (LTE), Bluetooth, WirelessHD and WiGig, and Z-Wave). As used herein, the phrase "network traffic information" may include the ID of the autonomous vehicle, X, Y and Z coordinates of the autonomous vehicle in an inventory management system, a timestamp from when the autonomous vehicle sent the information to the computer system, roam time between access points (the time period for the autonomous vehicle to successfully switch from one access point to another within the inventory management system), received signal strength indicators, timeouts that occur when at least one autonomous vehicle switches from one access point to another, beacons from the access points, and/or bitrates. As used herein, the phrase "wireless traffic information" may include any subset of information included in network traffic information, including the entirety of the information described in network traffic information. As used herein, the phrase "autonomous vehicle" may include a unit that is capable of moving within the inventory management system workspace and may include any appropriate components for propelling itself and navigating to a particular destination within the inventory management system workspace. The autonomous vehicle may also be capable of gathering and sending information about the inventory management system's network connectivity. A mobile drive unit may be a type of autonomous vehicle, in particular, an autonomous ground vehicle. As used herein, the phrase "timestamp" may include information about the time and/or date when information was received by or transmitted from the autonomous vehicle. As used herein, the phrases "beacon" or "beacon information" may include information indicating the frequency with which an access point announces its presence to surrounding autonomous vehicles. As used herein, the phrase "trend information" may include network traffic information gathered over one or more periods of time that may reflect reoccurring larger scale performance tendencies within the inventory management system.

In accordance with at least one embodiment, the service may provide information for improving, adjusting, modifying or optimizing the network of the inventory management system ("connectivity improvement information") to the user. The service may analyze the network traffic information gathered after a certain period of time and determine trends in the network connectivity of the autonomous vehicles and access points within the inventory management system. The service may generate connectivity improvement information based on the determined trends from the network traffic information. The connectivity improvement information may be utilized to provide instructions to aid the inventory management system to perform more efficiently. For example, the connectivity improvement information may indicate that shutting off certain access points or adding more access points would improve the efficiency of the inventory management system. In another example, the connectivity improvement information may be used to identify potential problems with individual autonomous vehicles or individual access points, to direct the autonomous vehicles to avoid certain areas with bad network connectivity, or to direct the autonomous vehicles to areas with good network connectivity. In still other examples, the connectivity improvement information may be utilized to change or update the inventory management system such as by adding, moving, removing, and/or changing the power of the access points, moving and/or altering physical structures present in the inventory management system that are impeding connectivity to access points, and/or redesigning the layout of the inventory management system. In an embodiment, the service may automatically optimize the inventory management system based on the generated connectivity improvement information. The connectivity improvement information may be graphically displayed on the GUI after the service analyzes the network traffic information and generates an optimization report. In other embodiments, the connectivity improvement information may be provided to a user via the GUI where the user may choose to view the connectivity improvement information before providing further instructions to update the inventory management system. In some examples, the user may select an option to automatically optimize the inventory management system based on the connectivity improvement information. For example, the service may provide instructions to shut off unused access points after analyzing the connectivity improvement information without the interaction of the user. In another example, the connectivity improvement information may be utilized to provide instructions based on different conditions or parameters, such as turning off access points in the inventory management system on certain days and times, designating certain locations within the inventory management system where no autonomous vehicles will be present, or any suitable combination of conditions and instructions provided according to the connectivity improvement information described herein.

FIG. 1 illustrates components of an inventory management system, in accordance with at least one embodiment. Inventory management system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory management system 10 is capable of moving inventory items between locations within workspace 70 to facilitate the entry, processing, and/or removal of inventory items from the inventory management system 10 and the completion of other tasks involving inventory items.

Management module 15 assigns tasks to appropriate components of inventory management system 10 and coordinates operation of the various components in completing the tasks. These tasks may relate not only to the movement and processing of inventory items, but also to the management and maintenance of the components of inventory management system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory management system 10 and its various components. Management module 15 may select components of inventory management system 10 to perform these tasks and communicate appropriate commands and/or data to the selected components to facilitate completion of these operations. Although shown in FIG. 1 as a single, discrete component, management module 15 may represent multiple components and may represent or include portions of mobile drive units 20 or other elements of inventory management system 10. As a result, any or all of the interactions between a particular mobile drive unit 20 and management module 15 that are described below may, in particular embodiments, represent peer-to-peer communication between that mobile drive unit 20 and one or more other mobile drive units 20. The contents and operation of an example embodiment of management module 15 which implements the inventory management system network traffic feature are discussed further below with respect to FIG. 7.

Mobile drive units 20 move inventory holders 30 between locations within workspace 70. Mobile drive units 20 may represent any devices or components appropriate for use in inventory management system 10 based on the characteristics and configuration of inventory holders 30 and/or other elements of inventory management system 10. In a particular embodiment of inventory management system 10, mobile drive units 20 represent independent, self-powered devices configured to freely move about workspace 70. In alternative embodiments, mobile drive units 20 represent elements of a tracked inventory management system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory management system 10 mobile drive units 20 may be configured to utilize alternative conveyance equipment to move within workspace 70 and/or between separate portions of workspace 70.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using access points (not pictured) located within or about the workspace 70 of the inventory management system 10, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol via the access points. As another example, in a tracked inventory management system 10, tracks or other guidance elements upon which mobile drive units 20 move may be wired to facilitate communication between mobile drive units 20 and other components of inventory management system 10. Furthermore, as noted above, management module 15 may include components of individual mobile drive units 20. Thus, for the purposes of this description, communication between management module 15 and a particular mobile drive unit 20 may represent communication between components of a particular mobile drive unit 20 and an access point transmitting information to the management module 15. In general, mobile drive units 20 may be powered, propelled, and controlled in any manner appropriate based on the configuration and characteristics of inventory management system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory management system 10.

Inventory items represent any objects suitable for storage, retrieval, and/or processing in an automated inventory management system 10. For the purposes of this description, "inventory items" may represent any one or more objects of a particular type that are stored in inventory management system 10. Thus, a particular inventory holder 30 is currently "storing" a particular inventory item if the inventory holder 30 currently holds one or more units of that type. As one example, inventory management system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory management system 10, boxes containing completed orders may themselves represent inventory items.

In particular embodiments, inventory management system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory management system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory management system 10.

Workspace 70 represents an area associated with inventory management system 10 in which mobile drive units 20 can move and/or inventory holders 30 can be stored. For example, workspace 70 may represent all or part of the floor of a mail-order warehouse in which inventory management system 10 operates. Although FIG. 1 shows, for the purposes of illustration, an embodiment of inventory management system 10 in which workspace 70 includes a fixed, predetermined, and finite physical space, particular embodiments of inventory management system 10 may include mobile drive units 20 and inventory holders 30 that are configured to operate within a workspace 70 that is of variable dimensions and/or an arbitrary geometry. While FIG. 1 illustrates a particular embodiment of inventory management system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory management system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory management system 10 and/or from external components in communication with management module 15. These inventory requests identify particular operations to be completed involving inventory items stored or to be stored within inventory management system 10 and may represent communication of any suitable form. For example, in particular embodiments, an inventory request may represent a shipping order specifying particular inventory items that have been purchased by a customer and that are to be retrieved from inventory management system 10 for shipment to the customer. Management module 15 may also generate task assignments 18 independently of such inventory requests, as part of the overall management and maintenance of inventory management system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory management system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory management system 10, as a whole, or individual components of inventory management system 10. For example, in particular embodiments, such decisions may be based on the popularity of particular inventory items, the staffing of a particular inventory station 50, the tasks currently assigned to a particular mobile drive unit 20, and/or any other appropriate considerations.

While the appropriate components of inventory management system 10 complete assigned tasks, management module 15 may interact with the relevant components to ensure the efficient use of space, equipment, manpower, and other resources available to inventory management system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory management system 10 may provide information to management module 15 regarding their current state, other components of inventory management system 10 with which they are interacting, and/or other conditions relevant to the operation of inventory management system 10. This may allow management module 15 to utilize feedback from the relevant components to update algorithm parameters, adjust policies, or otherwise modify its decision-making to respond to changes in operating conditions or the occurrence of particular events. For example, mobile drive unit 20 may provide network traffic information associated with the access points to the management module 15 for use in embodiments described herein.

In addition, while management module 15 may be configured to manage various aspects of the operation of the components of inventory management system 10, in particular embodiments, the components themselves may also be responsible for decision-making relating to certain aspects of their operation, thereby reducing the processing load on management module 15.

Figure 2:
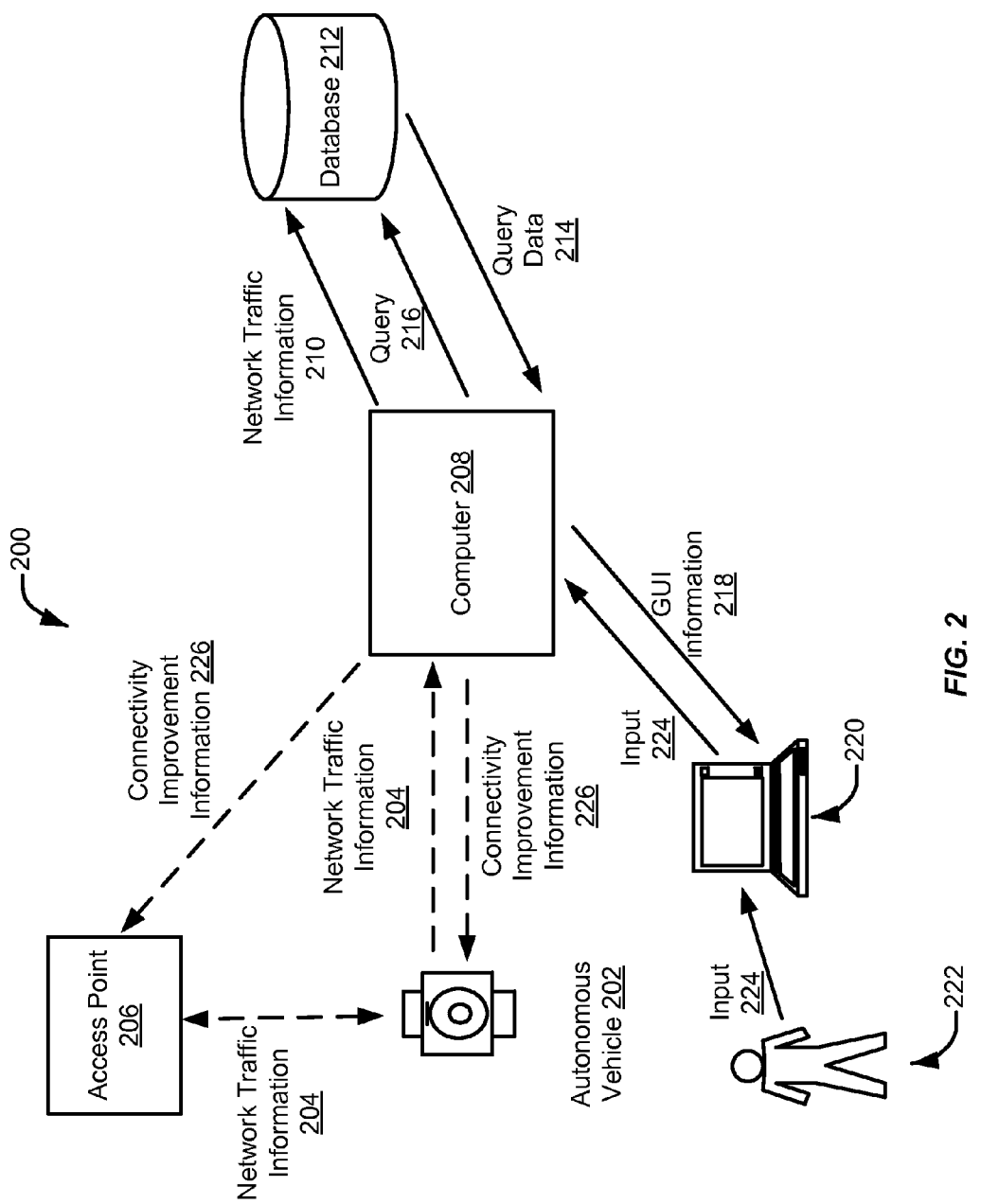
FIG. 2 illustrates a data flow diagram for an inventory management system network traffic feature, in accordance with at least one embodiment.

FIG. 2 illustrates a data flow diagram for an inventory management system network traffic feature. In accordance with at least one embodiment, the autonomous vehicle 202 may travel about an inventory management system obtaining and transmitting network traffic information 204. The autonomous vehicle 202 may obtain the network traffic information 204 by wirelessly connecting to different access points 206 in the inventory management system. The access points 206 may be located in any suitable location or configuration within an inventory management system to aid in the obtaining and transmitting of wireless traffic information. The autonomous vehicle 202 may send the network traffic information 204 in any format, e.g., a compressed format, to a computer system 208 associated with a service implementing the inventory management system network traffic feature described herein. The autonomous vehicle 202 may send the information in real time, or it may send it periodically, randomly, upon request, and/or upon certain triggering events, depending on configurations of embodiments described herein. For example, triggering events may include a network outage, a network restart, the start/end of a shift in the inventory management system, autonomous vehicle startup/shutdown, or the arrival of autonomous vehicle at particular locations within the inventory management system. In accordance with at least one embodiment, the computer system 208 may decompress the network traffic information 210, if it was previously compressed, and store it in a database 212 for later use and analysis. The computer system 208 may retrieve the network traffic information or query data 214 stored in the database 212 in response to a database query 216 from the computer system 208. In some embodiments, the computer system 208 may send the network traffic information or GUI information 218 retrieved by the query to a GUI that graphically displays the information on a user's computing device 220. In some embodiments, the computer system 208 may retrieve network traffic information, connectivity improvement information, or trend information from the database 212 and provide it for display on the GUI via the user's computing device 220. In other embodiments, the computer system 208 may store, access, or retrieve the network traffic information, connectivity improvement information, or trend information from the computer system 208 itself via local memory or other suitable storage devices.

A user 222 may provide input 224 to the computer system 208 by interacting with the GUI provided via the user's computing device 220. The input may specify, for example, a date range in which the user 222 wants to see the network traffic information displayed in the GUI. The computer system 208 may execute a query 216 based on the user input 224 which can result in the GUI being updated or altered in response to the user input 224. In an embodiment, the database 212 may return query data 214 based on the query 216 that can be utilized to update the GUI. In some embodiments, the computer system 208 is configured to analyze queries from the user 222 and provide information that can update or later update the GUI provided to the user based on the various filter functions and capabilities described herein.

Based on the network traffic information 204 received by the computer system 208, the computer system 208 may also generate connectivity improvement information 226. The connectivity improvement information 226 may include instructions for the autonomous vehicle 202 and/or the access point 206 to improve network efficiency in the inventory management system. In an embodiment, the computer system 208 may provide the connectivity improvement information 226 to the access points 206 in the inventory management system or the autonomous vehicles 202 separately or simultaneously. In some embodiments, the connectivity improvement information 226 may be provided to the user 222 which can be graphically displayed via the GUI presented via the user's computing device 220. In other embodiments, the connectivity improvement information 226 may be provided to a user via an email or network document presentation that includes text and graphic elements that provide instructions on optimizing the access points 206 and/or the autonomous ground vehicle 202. Alternatively, the computer system 208 may automatically provide instructions to the autonomous vehicle 202 and/or the access point 206 to improve network efficiency, without user interaction.

In accordance with at least one embodiment, the computer system 208 may also be configured to generate trend information based on the network traffic information 204. In an embodiment, the trend information may be displayed graphically to the user 222 via the GUI. In an embodiment, the trend information may be utilized by the computer system 208 to generate the connectivity improvement information. The trend information may indicate patterns determined from the network traffic information of the inventory management system. The patterns included in the trend information may indicate that certain access points are performing poorly while other access points in the same inventory management system are performing efficiently or being underutilized. The patterns included in the trend information may indicate efficient or inefficient traffic patterns for the autonomous vehicle 202, inefficient use of beacons, an abnormal amount of timeouts occurring with particular autonomous ground vehicles within the inventory management system, and/or potential problems with individual autonomous vehicles or individual access points, and/or may direct the autonomous vehicles to avoid certain areas with bad network connectivity, direct the autonomous vehicles towards areas with good network connectivity, change or update the inventory management system itself by adding, moving, removing, and/or changing the power of the access points, moving and/or altering physical structures present in the inventory management system that are impeding connectivity to access points, and/or redesigning the layout of the inventory management system.

In accordance with at least one embodiment, the computer system 208 may also be configured to generate alerts or alarms based on unusual trend information generated based on the network traffic information. In an embodiment, the trend information may be displayed graphically to the user 222 via the GUI. In an embodiment, the trend information may be provided to a user via email or any other suitable messaging or notification document or format.

Figure 3:
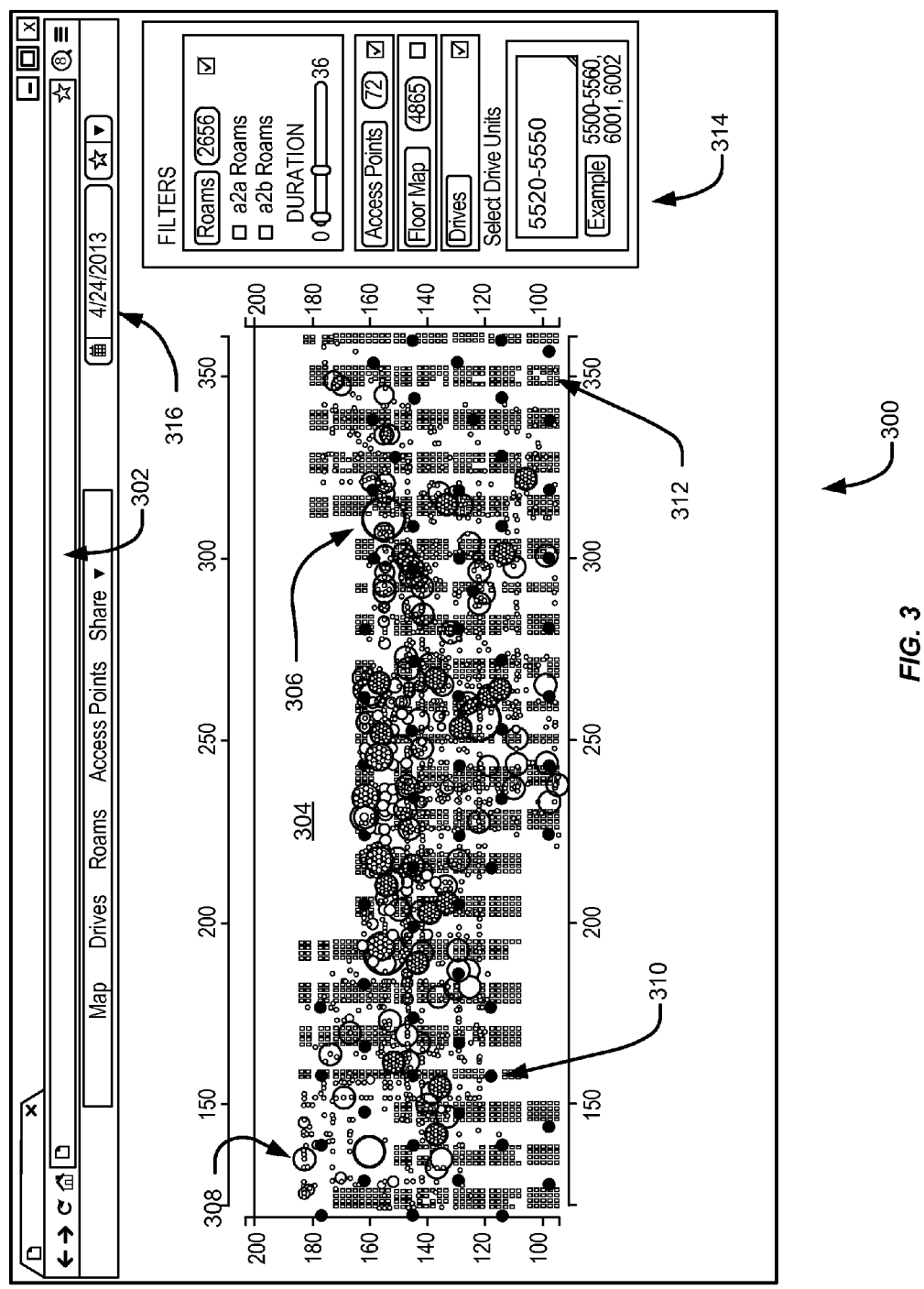
FIG. 3 illustrates an example user interface associated with an inventory management system network traffic feature, in accordance with at least one embodiment.

FIG. 3 illustrates an example user interface associated with an inventory management system network traffic feature, in accordance with at least one embodiment. FIG. 3 includes a user interface 300 that may graphically display network traffic information obtained by mobile drive units. The user interface 300 in FIG. 3 is presented in a network document 302 that can be displayed on a user's computing device. In accordance with at least one embodiment, the user interface 300 may be generated by a computer system associated with a service implemented by the inventory management system network traffic feature described herein and include: an inventory management system 304 (which can be a warehouse floor in an example) with associated X and Y axes indicating distances between various points in the inventory management system 304, graphical indicators of long 306 and short 308 roam times, graphical indicators of the location of access points 310 located in the inventory management system 304, graphical indicators of inventory holders 312, a plurality of filtering options 314 which gives a user the ability to filter the information that is graphically displayed on the user interface 300, and a date selection tool 316. Longer roam times 306 are illustrated in FIG. 3 by large circles with thicker outlines and shorter roam times 308 are illustrated by smaller circles with thinner outlines.

According to at least one embodiment, a user may interact with the date selection tool 316 to filter the network traffic information displayed in the user interface 300 based on a specific date range. The date selection tool 316 may filter network traffic information that was obtained on specific selected days, and an updated graphical representation of the inventory management system 304 may be provided to the user via the user interface 300. In an embodiment the date selection tool 316 may also filter based on shorter units of time, such as minute to minute time intervals, for example. The plurality of filtering options 314 can filter data based on types of roams, length of roam time, specific mobile drive units, and other filters appropriate for an inventory management system. A user may interact with the roam filter to filter the network traffic information displayed in the user interface 300 based on specific roam information. For example, the roam filter may filter based on types of roams or roam duration.

The user may filter based on roam duration to view where longer roam times occur in the inventory management system 304, which may cause connectivity issues with the mobile drive units. The user may filter based on types of roam to view when mobile drive units are successful in switching connection from one access point to another. The user may do this to analyze areas of the materials handling facility where there are weak or too few access points, and to determine problem areas in the inventory management system. A user may interact with the access point filter to filter the network traffic information displayed in the user interface 300 based on specific access points. For example, a user may utilize filter options 314 to select certain access points for which related network traffic information is to be displayed on the graphical user interface 300 in order to, for example, focus in on certain areas of the inventory management system and/or identify problem areas.

A user may interact with the drive unit filter to update the network traffic information displayed in the user interface 300 based on specific mobile drive units or mobile drive unit activity. The drive unit filter may allow a user to focus on certain specified mobile drive units within inventory management system 300 in order to more clearly view network traffic information associated with the specified drive units. The drive unit filter may also allow a user to focus on certain mobile drive unit activities, such as certain traffic paths, minimum roam time or communication with certain access points within inventory management system 300. Filtering drive units based on the drive unit activity may help a user diagnose problems in the inventory management system 300. A user may interact with filter options 314 to filter by particular inventory management systems. The user interface 300 may provide information for multiple inventory management systems, and/or multiple floors in each inventory management system. The user may want to view network traffic information associated with different floors with different floor plans associated with the same inventory management system. In another embodiment, the user interface 300 may display other information to the user such as high occurrences of roam times, inefficient access points or inefficient mobile drive units. For example, the user interface 300 illustrates that there are long roam times 306 in a particular area as shown in FIG. 3. Longer roam times may indicate a lack of wireless connectivity on relevant portions of the map, and/or inefficient access points which may be inefficiently utilizing resources such as network bandwidth in the inventory management system or attempting to connect with mobile drive units that have already established a strong connection with another access point.

According to another embodiment, the user interface 300 may be configured to allow a user to view trend information (not pictured). In at least one embodiment, the user may use the filters 314 to view the trend information. In another embodiment, the user interface 300 may be configured to allow a user to view historical problem areas within the inventory management system based on the trend information. The historical problem areas can be further filtered by the user utilizing the filter options 314 in user interface 300, thereby allowing a user to focus on particular aspects of the trend information determined by the service. According to another embodiment, the user interface may be configured to allow a user to view connectivity improvement information. In at least one embodiment, the connectivity improvement information may provide instructions to change the path of certain mobile drive units and/or shut off certain access points. The user interface 300 may include an option for a user to view only the connectivity improvement information, or both the network traffic information and the connectivity improvement information simultaneously, on the user interface 300.

Figure 4:
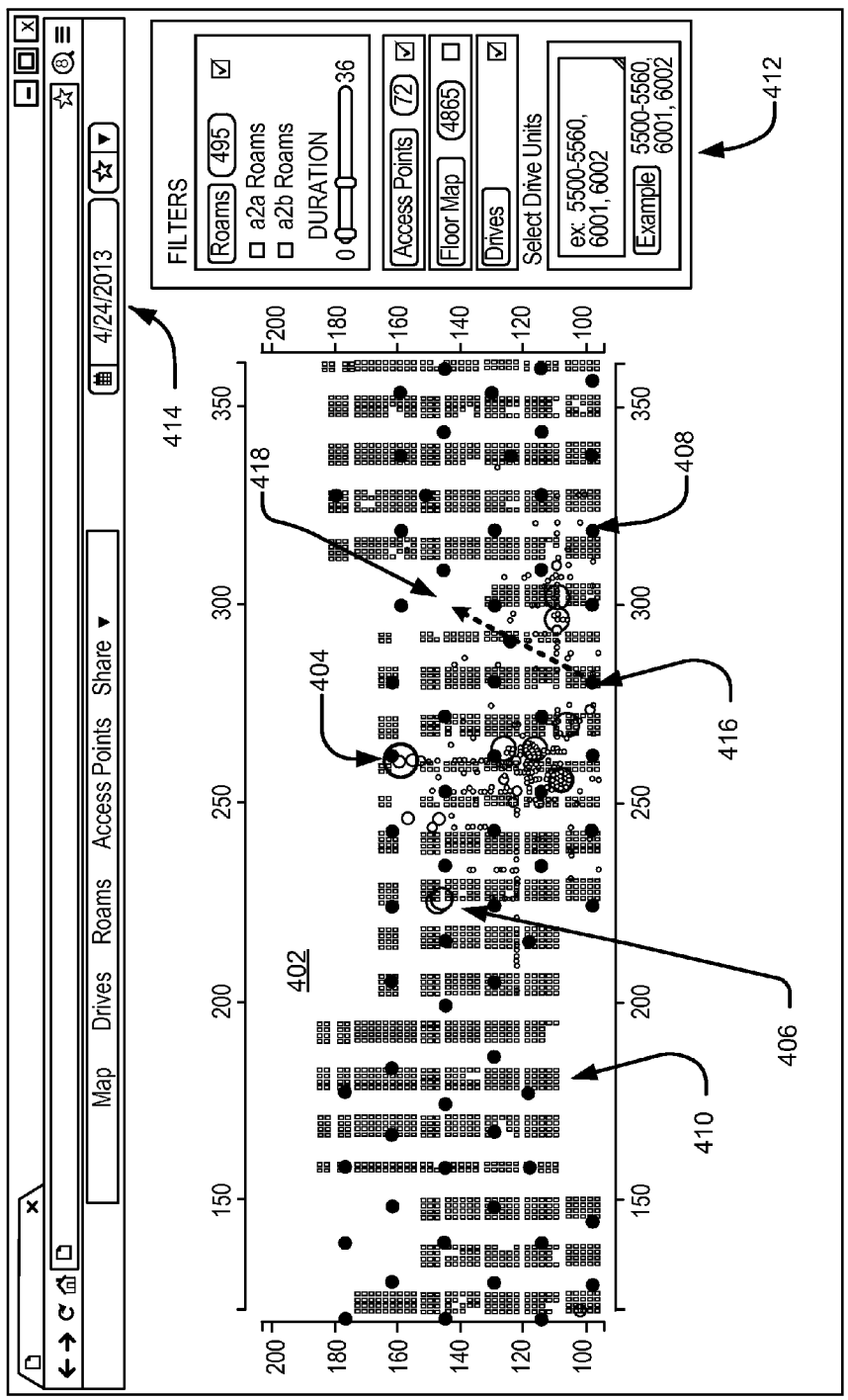
FIG. 4 illustrates an example user interface associated with an inventory management system network traffic feature, in accordance with at least one embodiment.

FIG. 4 illustrates an example user interface associated with an inventory management system network traffic feature, in accordance with at least one embodiment. FIG. 4 illustrates a user interface 400 that is similar to user interface 300 of FIG. 3 including the options and functionality of the user interface 300 as described above. The user interface 400 illustrated in FIG. 4 is presented in a network document but the user interface 400 may also be provided via a stand-alone native application configured to run on a computing device. The user interface 400 may be generated based on network traffic information obtained by mobile drive units within inventory management system 402. In accordance with at least one embodiment, the user interface 400 may include: a graphical representation of an inventory management system 402 (which can be a warehouse floor in an example) with graphical indicators of long 404 and short 406 roam times, graphical indicators of the location of access points 408 located in the inventory management system 402, graphical indicators of inventory holders 410, a plurality of filtering options 412 which gives a user the ability to filter the information that is to be graphically displayed on the user interface 400, and a date selection tool 414. According to at least one embodiment, the filtering options 412 can filter the network traffic information based on dates, types of roams, length of roam time, specific mobile drive units, and other filters suitable for an inventory management system.

In at least one embodiment, a user may click on an access point, such as access point 416, and drag to a blank area 418 of the inventory management system 402 displayed in user interface 400 as represented by the dashed line starting at 416 and ending at 418 in FIG. 4 to display roam times associated with mobile units traveling from the selected access point 416 to any available access point within the inventory management system 402. In some embodiments, the user interface 400 may be configured to utilize any of the filter options included in 412 to filter the updated user interface 400 based on the functionality described above including access point to multiple access point functionality, access point to access point functionality, and access point to particular mobile drive unit functionality. In another embodiment, a user may click on an access point and a mobile drive unit and the user interface 400 may update or alter to graphically display roam times associated with the user's selected access point and the mobile drive unit only. The user interface 400 may also display the traffic pattern of a particular mobile drive unit in inventory management system 402. Displaying information associated with selected access points and/or selected mobile drive units may help a user diagnose problems associated with specific access points and/or specific mobile drive units.

Figure 5:
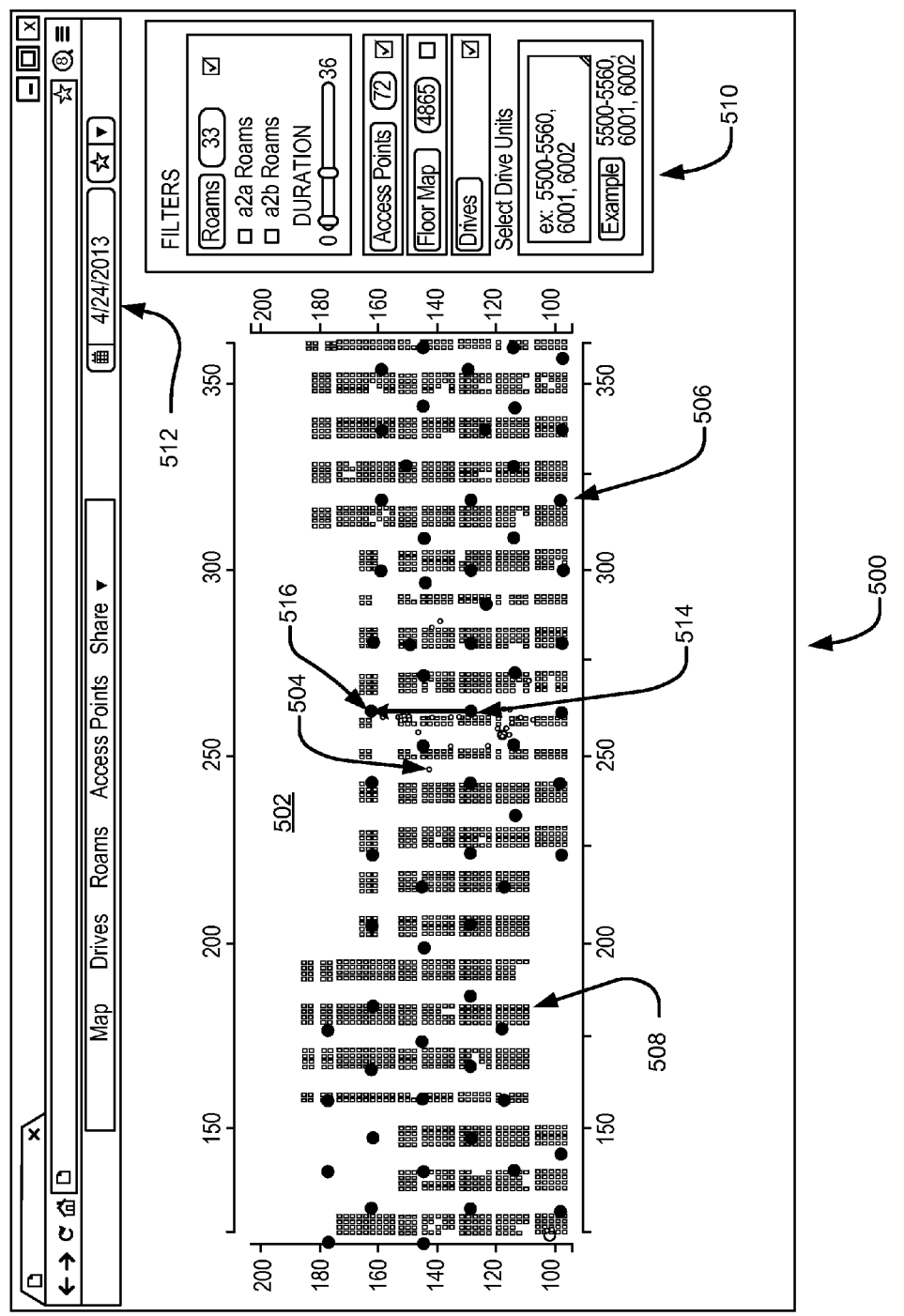
FIG. 5 illustrates an example user interface associated with an inventory management system network traffic feature, in accordance with at least one embodiment.

FIG. 5 illustrates an example user interface associated with an inventory management system network traffic feature, in accordance with at least one embodiment. FIG. 5 illustrates a user interface 500 that is similar to user interface 300 of FIG. 3 including the options and functionality of the user interface 300 as described above. The user interface 500 illustrated in FIG. 5 is presented in a network document but the user interface 500 may also be provided via a stand-alone native application configured to run on a mobile computing device. The user interface 500 may be generated based on network traffic information obtained by mobile drive units within inventory management system 502. In accordance with at least one embodiment, the user interface 500 may include: a graphical representation of an inventory management system 502 (which can be a warehouse floor in an example) with graphical indicators of roam times 504, graphical indicators of the location of access points 506 located in the inventory management system 502, graphical indicators of inventory holders 508, a plurality of filtering options 510 which gives a user the ability to filter the information that is to be graphically displayed on the user interface 500, and a date selection tool 512. According to at least one embodiment, the filtering options 510 can filter the network traffic information based on dates, types of roams, length of roam time, specific mobile drive units, and other filters suitable for an inventory management system.

In at least one embodiment, a user may interact with the user interface 500 by clicking on a particular access point, such as access point 514 and drag their interaction tool, such as by a mouse, to another access point 516 in the inventory management system 502 to display roam times associated with mobile drive units traversing from access point 514 to access point 516. In accordance with at least one embodiment, the user interface 500 may be configured to update based on the user interacting with the user interface 500 to display roam times for associated mobile drive units in inventory management system 502 selected by the user as described above, thus displaying roam times according to an access point to access point functionality within inventory management system 502. Displaying roam times between certain access points may help a user diagnose connectivity problems in the inventory management system 502. In another embodiment, a user may interact with the user interface 500 by clicking on an access point to provide instructions to the inventory management system 502 regarding the specific access point. The instructions provided may include instructions to deactivate the particular access point or manipulate parameters associated with the access point, such as mobile unit priority, signal strength, or total number of mobile drive units that can be serviced by the particular access point. Deactivating or modifying certain access points may improve the network connectivity of the inventory management system, thus improving the efficiency of the inventory management system.

Figure 6:
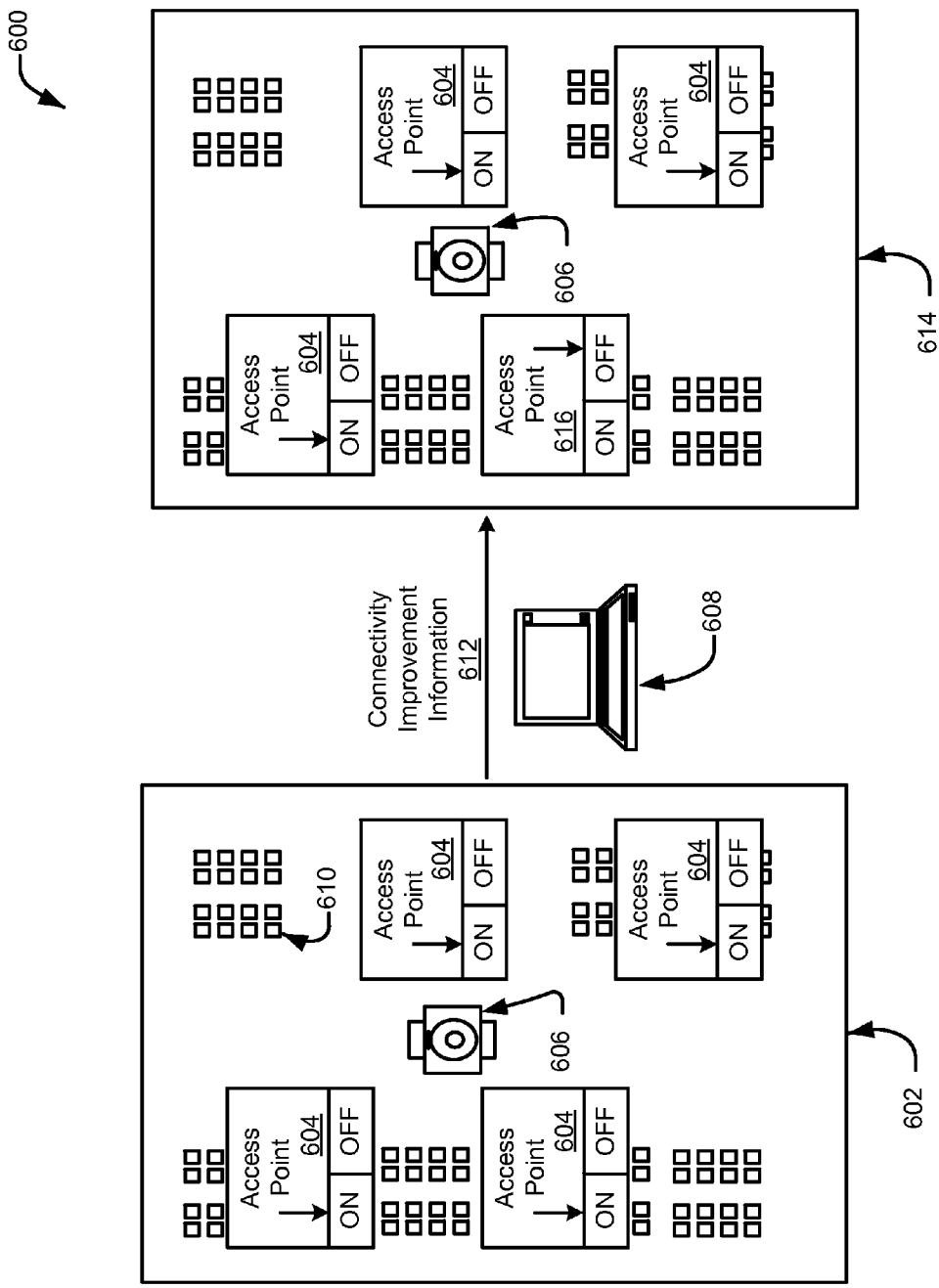
FIG. 6 illustrates a flow diagram of an inventory management system network traffic feature associated with connectivity improvement information, in accordance with at least one embodiment.

FIG. 6 includes an inventory management system 602 that includes one or more access points 604 interacting with a mobile drive unit 606 to obtain and transmit network traffic information to a computer system 608 implementing a service associated with the inventory management system network traffic feature described herein. The inventory management system 602 may also include one or more inventory holders 610 configured to store or maintain inventory within the inventory management system 602.

Inventory management system 602 contains four access points (604) that are currently providing instructions or wireless connectivity to the mobile drive unit 606 to aid the mobile drive unit 606 in interacting and performing tasks within the inventory management system 602. In accordance with at least one embodiment, the computer system 608 may generate connectivity improvement information 612 for the inventory management system 602 based on the received network traffic information from the mobile drive unit 606. The connectivity improvement information 612 may include instructions for the mobile drive unit 606 and/or the access points 604 for improving network efficiency in the inventory management system 602. FIG. 6 includes inventory management system 614 which represents inventory management system 602 after implementing the connectivity improvement information 612. Inventory management system 614 includes an access point 616 that has been placed in an inactive state based on the instructions provided in the connectivity improvement information 612. The connectivity improvement information 612 may have indicated that the particular access point 616 was not being utilized within the inventory management system 602 and thus placing it in an inactive state would provide increased efficiency resulting in inventory management system 614. In accordance with at least one embodiment, the connectivity improvement information 612 may provide instructions to access points, such as access points 604 to prioritize certain mobile drive units over other mobile drive units within the inventory management system 602. In other embodiments, the connectivity improvement information may include instructions which are provided directly to the mobile drive unit 606 via the access points 604 which can change the traffic path of the mobile drive unit 606, or any other instructions to improve efficiency within an inventory management system as described herein.

Figure 7:
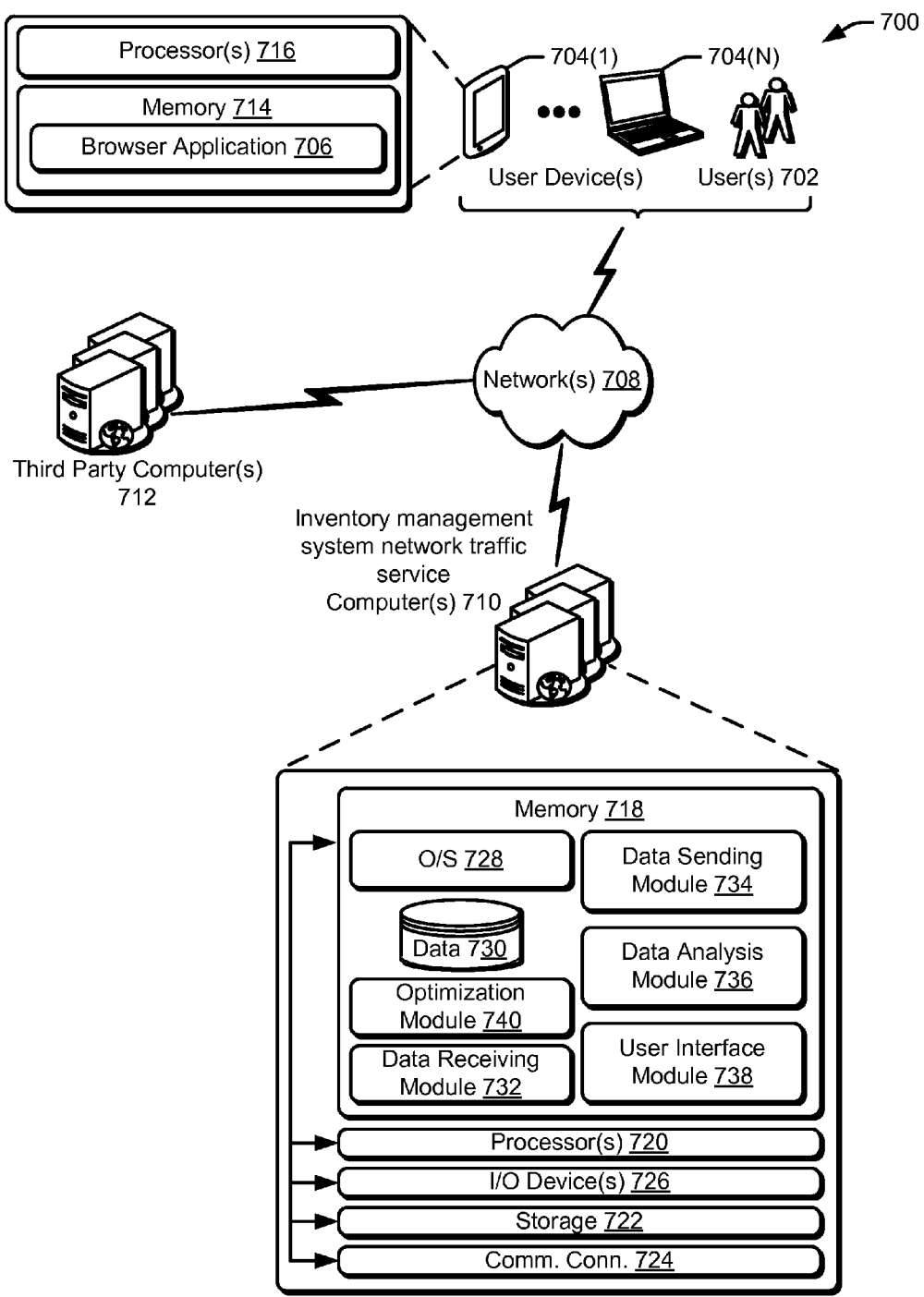
FIG. 7 illustrates an example architecture for an inventory management system network traffic feature as described herein that includes one or more service provider computer(s) and/or a user device connected via one or more networks, in accordance with at least one embodiment.

FIG. 7 illustrates an example architecture for an inventory management system network traffic feature as described herein that includes one or more service provider computer(s) and/or a user device connected via one or more networks, in accordance with at least one embodiment. In architecture 700, one or more users 702 (i.e., inventory management system network traffic feature users) may utilize user computing devices 704(1)-(N) (collectively, user computing devices 704) to access an application 706 configured to provide the inventory management system network traffic feature (e.g., a web browser), via one or more networks 708. In some aspects, the application 706 may be hosted, managed, and/or provided by a computing resources service or service provider, such as by utilizing one or more service provider computer(s) 710 associated with the system. The one or more service provider computer(s) 710 may provide a native application which is configured to run on the user devices 704 which the user 702 may interact with to be presented with the inventory management system network traffic feature as described herein. The one or more service provider computer(s) 710 may, in some examples, provide computing resources such as, but not limited to, client entities, low latency data storage, durable data storage, data access, management, virtualization, cloud-based software solutions, electronic content performance management, etc. The one or more service provider computer(s) 710 may also be operable to provide web hosting, computer application development, and/or implementation platforms, combinations of the foregoing, or the like to the one or more users 702. The one or more service provider computer(s) 710, in some examples, may obtain network traffic information for an inventory management system, determine trend information which indicates problems in the inventory management system, and provide connectivity improvement information based on the trend information to the user. In some examples, the one or more service provider computer(s) 710 may communicate with one or more third party computers 712 to provide services associated with the inventory management system network traffic feature described herein. For example, the service may communicate with one or more third party computers 712 to receive and transmit network traffic information and provide instructions including connectivity improvement information to one or more third parties.

In some examples, the networks 708 may include any one or a combination of many different types of networks, such as cable networks, the Internet, wireless networks, cellular networks and other private and/or public networks. While the illustrated example represents the users 702 accessing the application 706 over the networks 708, the described techniques may equally apply in instances where the users 702 interact with the one or more service provider computer(s) 710 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 706 may allow the users 702 to interact with the computer(s) 710 by providing input into the browser application 706. The input may filter data displayed in the browser application 706. The application 706 may provide users with options to filter network traffic information based on factors such as dates, roam time, access points, or mobile drive units as described herein.

The user devices 704 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 704 may be in communication with the one or more service provider computer(s) 710 via the networks 708, or via other network connections. Additionally, the user devices 704 may be part of the distributed system managed by, controlled by, or otherwise part of the one or more service provider computer(s) 710 (e.g., a console device integrated with the one or more service provider computer(s) 710).

In accordance with at least one embodiment, the user devices 704 may include at least one memory 714 and one or more processing units (or processor(s)) 716. The processor(s) 716 may be implemented as appropriate in hardware, computer-executable instructions, firmware, or combinations thereof. Computer-executable instruction or firmware implementations of the processor(s) 716 may include computer-executable or machine-executable instructions written in any suitable programming language to perform the various functions described. The user devices 704 may also include geo-location devices (e.g., a global positioning system (GPS) device or the like) for providing and/or recording geographic location information associated with the user devices 704.

The memory 714 may store program instructions that are loadable and executable on the processor(s) 716, as well as data generated during the execution of these programs. Depending on the configuration and type of user device 704, the memory 714 may be volatile (such as random access memory (RAM)) and/or non-volatile (such as read-only memory (ROM), flash memory, etc.). The user device 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM.

Turning to the contents of the memory 714 in more detail, the memory 714 may include an operating system and one or more application programs or services for implementing the features disclosed herein including at least a user provided input element or electronic service web page, such as via the browser application 706 or dedicated applications (e.g., smart phone applications, tablet applications, etc.). The browser application 706 may be configured to receive, store, and/or display a website or other interface for interacting with the one or more service provider computer(s) 710. Additionally, the memory 714 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 702 provided response to a security question or a geographic location obtained by the user device 704.

In some aspects, the one or more service provider computer(s) 710 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computer(s) 710 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the one or more service provider computer(s) 710 may be in communication with the user devices 704 and/or other service providers via the networks 708, or via other network connections. The one or more service provider computer(s) 710 may include one or more servers, perhaps arranged in a cluster, as a server farm, or as individual servers not associated with one another. These servers may be configured to implement the inventory management system network traffic services described herein as part of an integrated, distributed computing environment.

In one illustrative configuration, the one or more service provider computer(s) 710 may include at least one memory 718 and one or more processing units (or processor(s)) 720. The processor(s) 720 may be implemented as appropriate in hardware, computer-executable instructions, firmware, or combinations thereof. Computer-executable instruction or firmware implementations of the processor(s) 720 may include computer-executable or machine-executable instructions written in any suitable programming language to perform the various functions described.

The memory 718 may store program instructions that are loadable and executable on the processor(s) 720, as well as data generated during the execution of these programs. Depending on the configuration and type of the one or more service provider computer(s) 710, the memory 718 may be volatile (such as RAM) and/or non-volatile (such as ROM, flash memory, etc.). The one or more service provider computer(s) 710 or servers may also include additional storage 722, which may include removable storage and/or non-removable storage. The additional storage 722 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 718 may include multiple different types of memory, such as SRAM, DRAM, or ROM.

The memory 718, the additional storage 722, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. Additional types of computer storage media that may be present in the one or more service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computer(s) 710. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computer(s) 710 may also contain communications connection(s) 724 that allow the one or more service provider computer(s) 710 to communicate with a stored database, another computing device or server, user terminals and/or other devices on the networks 708. The one or more service provider computer(s) 710 may also include I/O device(s) 726, such as a keyboard, a mouse, a pen, a voice input device, a touch input device, a display, speakers, a printer, etc.

Turning to the contents of the memory 718 in more detail, the memory 718 may include an operating system 728, one or more data stores 730, and/or one or more application programs or services for implementing the features disclosed herein including a data receiving module 732, a data sending module 734, a data analysis module 736, a user interface module 738, and an optimization module 740.

In accordance with at least one embodiment, the data receiving module 732 may be configured to receive network traffic information from autonomous vehicles in an inventory management system. In at least one embodiment, the network traffic information may contain access point received signal strength indicators, timeouts that occur when an autonomous vehicle fails to switch from one access point to another, beacons or beacon information from the access points, bitrates from the plurality of access points, roam duration when switching from one access point to another, X, Y and Z coordinates of the autonomous vehicle, a timestamp, ID, or other information as described above such as network traffic information. The data receiving module 732 may receive the network traffic information periodically or it may receive the network traffic information in real time, depending on configurations of the autonomous vehicles. The data receiving module 732 may store the received network traffic information in a database such as database 730. In accordance with at least one embodiment, the data receiving module 732 may be configured to receive a compressed data structure from the autonomous vehicle that contains the network traffic information. The data receiving module 732 may be further configured to decompress the compressed data structure for use in embodiments described herein.

In accordance with at least one embodiment, the data sending module 734 and the user interface module 738 may be configured to provide the information stored in the database to a graphical user interface as described in FIGS. 3-5. In an embodiment, the data sending module 734 may provide the network traffic information without the use of a database. The data sending module 734 may provide all the network traffic information stored in the database to the user interface module 738, or it may only send certain data depending on parameters passed to the data sending module 734 as a result of the user's interacting with the user interface, such as by utilizing the filter options 314 included in FIG. 3. For example, the data sending module 734 may only provide network traffic information from certain dates or it may filter the network traffic information in another way, as described herein. Depending on its configurations, the data sending module 734 may also provide trend information generated in the data analysis module 736 or connectivity improvement information generated in the optimization module 740.

In accordance with at least one embodiment, the data analysis module 736 may be configured to analyze the network traffic information received by the data receiving module 732. The data analysis module 736 may analyze the network traffic information to provide trend information to the optimization module 740 or data sending module 734. In accordance with at least one embodiment, the data analysis module 736 may generate trend information that indicates inefficiencies in an inventory management system including which mobile drive units are malfunctioning, or other trend information. In some embodiments, the data analysis module may provide the trend information to the data sending module 734 to be provided to the user interface module 738 and displayed graphically via a user interface generated by the user interface module 738, and/or it may provide the trend information to the optimization module 740 so the optimization module may use it to generate connectivity improvement information. In accordance with at least one embodiment, the data analysis module 736 may be configured to maintain one or more threshold values or levels for use in determining trends which indicate inefficiencies within an inventory management system. The data analysis module 736 may generate and provide trend information when specific parameters of the network traffic information exceed the one or more thresholds. For example, the data analysis module 736 may generate and provide the trend information based on a comparison of roam times to a roam time threshold, such that the roam times would need to exceed the roam time threshold before the trend information should be generated. Other thresholds related to data included in the network traffic information may be maintained and updated by the service utilizing the data analysis module 736. Thresholds related to beacons of the access points, time outs associated with autonomous vehicles, or bandwidth usage of an access point may be updated by the service utilizing the data analysis module 736. For example, the data analysis module 736 may generate and provide the trend information based on a comparison of time out information received from autonomous vehicles to a time out threshold, such that the time outs occurring with a particular autonomous vehicle would need to exceed the time out threshold before the trend information would be generated. In accordance with at least one embodiment, the data analysis module 736 may generate and provide the trend information without a comparison to one or more thresholds.

In accordance with at least one embodiment, the user interface module 738 may be configured to receive data from the data sending module 734. The user interface module 738 may receive network traffic information received in the data receiving module 732 and it may graphically display the network traffic information. In an embodiment, the user interface module 738 may receive trend information generated by the data analysis module 736 and it may graphically display the trend information. The user interface module 738 may be configured to provide the functionality of the filters (described in FIGS. 3-5 above) for a user to input instructions to determine the particular network traffic information that the user interface module 738 is to display graphically in a generated user interface. In another embodiment, the user interface module 738 may display the connectivity improvement information, trend information, or any information associated with an inventory management system as described herein. In accordance with at least one embodiment, the user interface module 738 and data sending module 734 may be configured to enable a user to provide instructions via the graphical user interface to the access points and/or the autonomous vehicles to prioritize particular parameters of the network traffic information obtained and transmitted by the autonomous vehicles or to exclude certain parameters all together.

In accordance with at least one embodiment, the optimization module 740 may be configured to generate connectivity improvement information that the data sending module 734 may provide to be displayed graphically though the user interface module 738. The optimization module 740 may use network traffic information received in the data receiving module 732. In at least one embodiment, the optimization module 740 may also use trend information generated in the data analysis module 736. The optimization module 740 may provide connectivity improvement information to a user, directly to access points, and/or directly to autonomous vehicles. In at least one embodiment, the optimization module 740 may provide connectivity improvement information to access points and/or autonomous vehicles within an inventory management to alter/change their behavior or configuration. For example, the connectivity improvement information may include instructions indicating that some access points are to be deactivated or that the access points should prioritize some communications from autonomous vehicles over other autonomous vehicles within an inventory management system. In another embodiment, the optimization module 740 may provide connectivity improvement information to autonomous vehicles that will change the traffic path of the mobile drive units. In another embodiment, the optimization module 740 may provide connectivity improvement information that is graphically displayed to the user through the user interface module 738.

In accordance with at least one embodiment, the optimization module 740 and the data analysis module 736 may be configured to provide instructions for the configuration and layout of a new or different inventory management system based at least in part on received network traffic information from an inventory management system. For example, the service may be configured to utilize modules 736 and 740 to generate the number of autonomous vehicles, traffic paths of the autonomous vehicles, the number of access points, and the parameters associated with the autonomous vehicles and access points required to efficiently set up or implement a new inventory management system. The service may also be configured to utilize the trend information to provide predictive efficiency statistics for an inventory management system based on various input parameters such as the space of the proposed inventory management system, the number of potential autonomous vehicles, and the number of potential access points. Modules 736, 738, and 740 may be configured to provide a graphical representation of the proposed inventory management system or hypothetical inventory management system, as described above, that can provided to a user via a GUI generate by the service.

Figure 8:
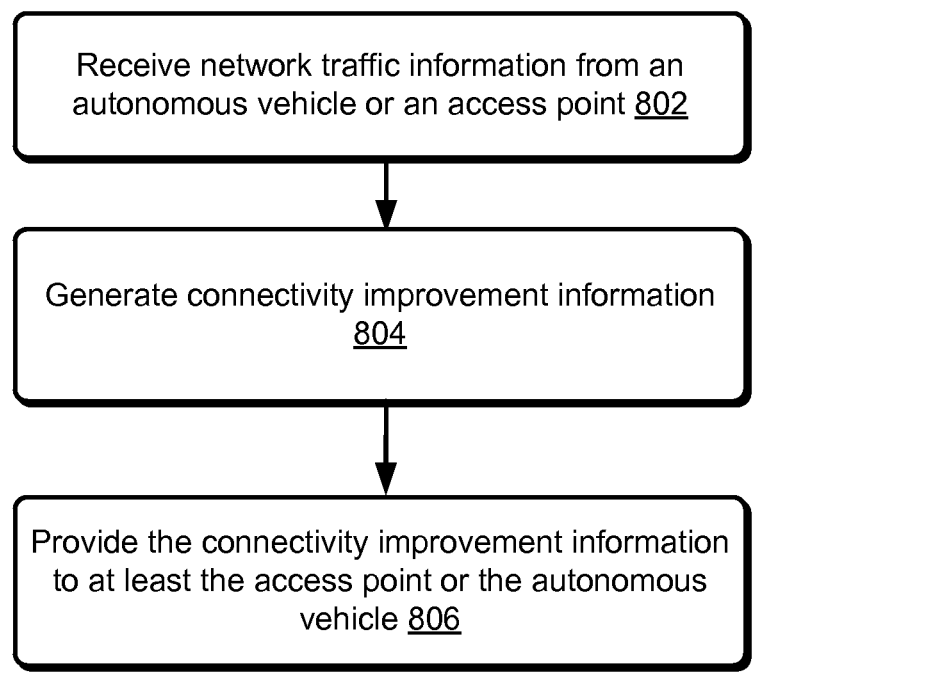
FIG. 8 illustrates a flow diagram of a process for an inventory management system network traffic feature as described herein, in accordance with at least one embodiment.
Figure 9:
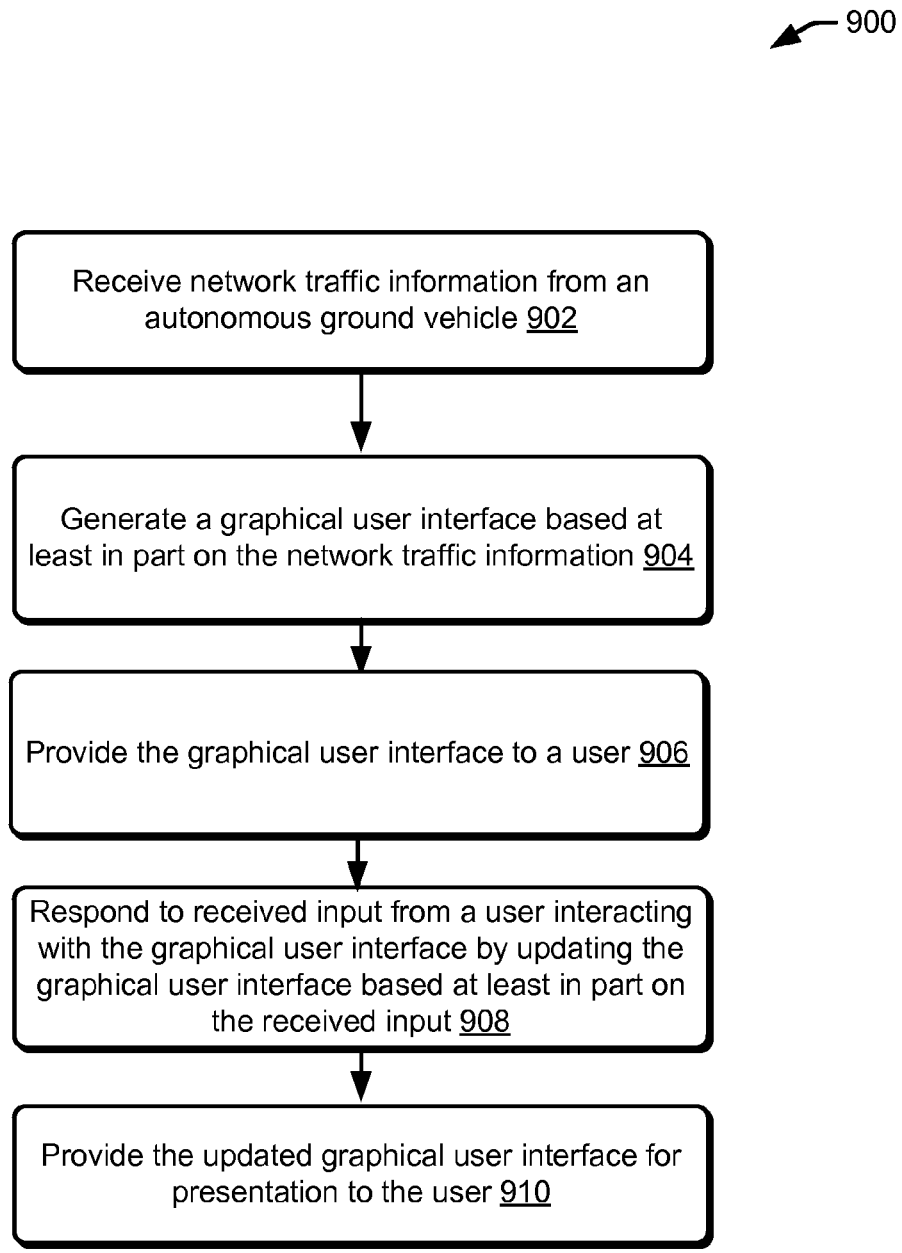
FIG. 9 illustrates a flow diagram of a process for an inventory management system network traffic feature as described herein, in accordance with at least one embodiment.

FIGS. 8 and 9 illustrate example flow diagrams showing respective processes 800 and 900 for providing an inventory management system network traffic feature described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, some of the described operations may be omitted in some embodiments.

Additionally, some, any, or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computer(s) 710 (e.g., utilizing at least one of the data receiving module 732, the data sending module 734, the data analysis module 736, the user interface module 738, and optimization module 740 in communication with one or more data stores 730) shown in FIG. 7, may perform the process 800 of FIG. 8. In FIG. 8 the process 800 may include receiving network traffic information from an autonomous vehicle or an access point at 802. In accordance with at least one embodiment, the network traffic information may include information about roam times associated with the autonomous vehicle interacting with a plurality of access points in an inventory management system. The process 800 may include generating connectivity improvement information at 804. In accordance with at least one embodiment, the connectivity improvement information may be generated based at least in part on the network traffic information received from the autonomous vehicle. In an embodiment, the network traffic information may be utilized to generate trend information where the trend information can include network traffic information gathered over one or more periods of time that may reflect reoccurring larger scale performance tendencies within the inventory management system. The trend information may be used to generate the connectivity improvement information in some embodiments. In accordance with at least one embodiment, the network traffic information, the trend information, and the connectivity improvement information may be provided to a user via a graphical user interface, as described above. The graphical user interface may be configured to receive user input from the user, which input may cause updates to the information presented to the user via the graphical user interface and/or provide instructions to an access point or autonomous vehicle represented in the graphical user interface of the inventory management system presented to the user.

The process 800 may conclude at 806 by providing the connectivity improvement information to at least the access point and/or the autonomous vehicle of the inventory management system. In accordance with at least one embodiment, and as described above, the connectivity improvement information may include instructions for changing a configuration of the access point or instructions for altering a configuration of the autonomous vehicle. For example, the connectivity improvement information may include instructions indicating that some access points are to be deactivated or that the access points should prioritize some communications from autonomous vehicles over other autonomous vehicles within the inventory management system. In another embodiment, connectivity improvement information may include instructions for autonomous vehicles that result in the autonomous vehicles changing their traffic paths within the inventory management system.

FIG. 9 illustrates a flow diagram of a process for an inventory management system network traffic feature described herein. In some examples, the one or more service provider computer(s) 710 (e.g., utilizing at least one of the data receiving module 732, the data sending module 734, the data analysis module 736, the user interface module 738, and optimization module 740 in communication with one or more data stores 730) shown in FIG. 7, may perform the process 900 of FIG. 9. In FIG. 9 the process 900 may include receiving network traffic information from an autonomous vehicle at 902. In accordance with at least one embodiment, the network traffic information may indicate communication for the autonomous vehicle roaming between pairs of access points in a plurality of access points in an inventory management system. In some embodiments, the network traffic information may include signal strength indicators associated with an access point, timeouts that occur when the autonomous vehicle switches from the at least one access point to another access point of the plurality of access points, beacons from the at least one access point, bitrates from the at least one access point, X, Y and Z coordinates of the autonomous vehicle, a timestamp, or an ID of the autonomous vehicle. In accordance with at least one embodiment, the network traffic information may be received from either the autonomous vehicle or the access points within the inventory management system. The process 900 may include generating a graphical user interface (GUI) based at least in part on the network traffic information at 904. In accordance with at least one embodiment, the GUI may be configured to be presented via a network document or a native stand-alone application configured to run on a computing device or mobile computing device. The process 900 may include providing the graphical user interface to a user at 906. The process 900 may include responding to received input from a user interacting with the graphical user interface by updating the graphical user interface at 908. In accordance with at least one embodiment, the received input may include instructions to filter the network traffic information provided to the graphical user interface and the user. The process 900 may conclude at 910 by providing the updated graphical user interface for presentation to the user.

Figure 10:
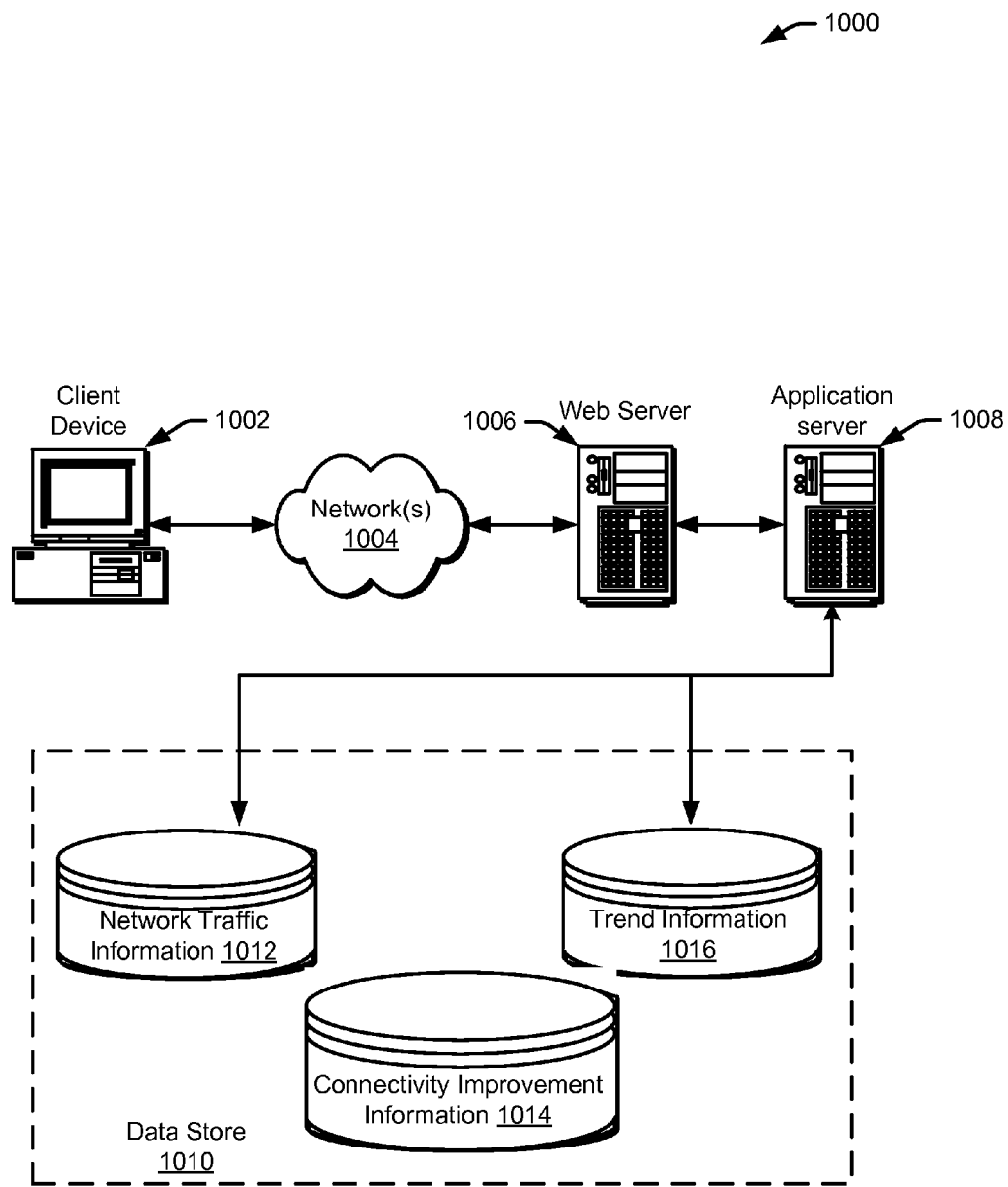
FIG. 10 illustrates an environment in which various embodiments of the inventory management system network traffic feature can be implemented, in accordance with at least one embodiment.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing network traffic information 1012 and trend information 1016. The data store also is shown to include a mechanism for storing connectivity improvement information 1014, which can be used for providing instructions to improve efficiency within an inventory management system as described herein. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:
   a plurality of access points situated in a materials handling facility;
   a mobile drive unit for moving inventory within the inventory management system, and for receiving and transmitting data from and to the plurality of access points;
   a computer system for:
      receiving the data from the mobile drive unit, the data including at least roam times associated with network connectivity between the mobile drive unit and at least one of the plurality of access points;
      generating connectivity improvement information based at least in part on the data; and
      providing the connectivity improvement information to at least one of: the at least one of the plurality of access points or the mobile drive unit, the connectivity improvement information comprising at least one of (1) instructions for the at least one of the plurality of access points to change a first configuration of the at least one of the plurality of access points or (2) instructions for the mobile drive unit to alter a second configuration of the mobile drive unit.

2. The inventory management system of claim 1, wherein the data includes at least one of signal strength indicators associated with an access point, timeouts that occur when the mobile drive unit switches from the at least one access point to another access point of the plurality of access points, beacons from the at least one access point, bitrates from the at least one access point, coordinates of the mobile drive unit, a timestamp, or an ID of the mobile drive unit.

3. The inventory management system of claim 1, wherein the computer system is further configured for providing a graphical user interface (GUI) to a user, the GUI graphically representing information corresponding to the data received by the computer system, wherein the data is stored in a database that is in communication with the GUI.

4. The inventory management system of claim 3, wherein the GUI includes the connectivity improvement information and is configured to receive input from the user to implement the connectivity improvement information to instruct the mobile drive unit or the at least one of the plurality of access points.

5. The inventory management system of claim 1, wherein the computer system is further configured for generating trend information based at least in part on the data, wherein generating the connectivity improvement information includes using the trend information.

6. A computer-implemented method, comprising:
   receiving, by a computer system, from an autonomous vehicle, network traffic information, the network traffic information including information related to network connectivity between the autonomous vehicle and at least one access point of a plurality of access points in a first inventory management system;
   generating, by the computer system, a graphical user interface displaying the network traffic information on a map of the first inventory management system,
   the network traffic information including at least one of roam time between the at least one access point and another access point, signal strength indicators associated with the at least one access point, timeouts that occur when the autonomous vehicle switches from the at least one access point to another access point of the plurality of access points, beacons from the at least one access point, or bitrates from the at least one access point of the plurality of access points; and automatically providing, by the computer system, instructions to alter at least one of a first configuration of the at least one access point or a second configuration of the autonomous vehicle based on the network traffic information.

7. The computer-implemented method of claim 6, further comprising:
providing the graphical user interface to a user;
receiving input from the user interacting with the graphical user interface:
updating the graphical user interface based at least in part on the received input; and
providing for presentation the updated graphical user interface to the user.

8. The computer-implemented method of claim 7, wherein receiving the input from the user includes a selection to filter the network traffic information included in the graphical user interface, wherein the selection includes at least one of a date, a time, a particular access point of the plurality of access points, a particular autonomous vehicle, a length of roam time between access points, beacon information of the access points, a particular map of the first inventory management system, or a traffic pattern of the particular autonomous vehicle.

9. The computer-implemented method of claim 7, further comprising:
generating connectivity improvement information based at least in part on the network traffic information,
specifying a threshold for a portion of the information included in the network traffic information based on the user utilizing the graphical user interface, wherein automatically providing, by the computer system, the instructions to alter the at least one of the first configuration or the second configuration is based at least in part on the threshold and the connectivity improvement information.

10. The computer-implemented method of claim 6, further comprising analyzing the network traffic information to determine trend information, the trend information identifying inefficient behavior of the autonomous vehicle or the at least one access point of the plurality of access points in the first inventory management system based at least in part on the network traffic information.

11. The computer-implemented method of claim 10, further comprising utilizing the trend information for providing instructions to a second inventory management system, the instructions indicating a first number of the autonomous vehicles and the first configuration of the first number of the autonomous vehicles and a second number of the plurality of access points and the second configuration of the second number of the plurality of access points for the second inventory management system to implement in an initial configuration.

12. The computer-implemented method of claim 10, further comprising generating connectivity improvement information based at least in part on the trend information, the instructions to alter the at least one of the first configuration or the second configuration further being based on the connectivity improvement information.

13. A non-transitory computer-readable storage medium storing computer-executable instructions that, when executed by a computer system, cause the computer system to perform operations comprising:
receiving, from an autonomous vehicle, network traffic information, the network traffic information indicating network connectivity between the autonomous vehicle and at least one access point of a plurality of access points in an inventory management system;
generating a graphical user interface based at least in part on the network traffic information;
providing the graphical user interface for presentation to a user; and
receiving input from the user interacting with the graphical user interface, the input including instructions to filter the network traffic information provided via the graphical user interface:
updating the graphical user interface based at least in part on the received input; and
providing the updated graphical user interface for presentation to the user.

14. The non-transitory computer-readable storage medium of claim 13, wherein the instructions further cause the computer system to perform operations comprising generating connectivity improvement information based at least in part on the network traffic information, wherein the connectivity improvement information includes at least first instructions to turn on or off the at least one access point, adjust a signal strength of the at least one access point, rearrange the at least one access point in the inventory management system, or adjust a number of autonomous vehicles configured to interact with the at least one access point.

15. The non-transitory computer-readable storage medium of claim 14, wherein the connectivity improvement information includes at least second instructions to update traffic patterns of the autonomous vehicle.

16. The non-transitory computer-readable storage medium of claim 13, wherein the instructions further cause the computer system to perform operations comprising:
providing instructions to the at least one access point of the plurality of access points to prioritize access of a particular autonomous vehicle over other autonomous vehicles in the inventory management system, the instructions based at least in part on connectivity improvement information generated from the network traffic information.

17. The non-transitory computer-readable storage medium of claim 13, wherein the instructions further cause the computer system to perform operations comprising:
receiving, from the user, selection of a first access point and a second access point from the plurality of access points via the graphical user interface; and
updating the graphical user interface to display roam time and position of the autonomous vehicle between the first access point and the second access point, the roam time indicating an amount of time between the autonomous vehicle disconnecting from the first access point and connecting to the second access point.

18. The non-transitory computer-readable storage medium of claim 13, wherein the instructions further cause the computer system to perform operations comprising:
receiving, from the user, selection of a first access point and an area of a map associated with the inventory management system via the graphical user interface; and
updating the graphical user interface to display roam time and position of the autonomous vehicle between the first access point and any other access point of the plurality of access points of the inventory management system, the roam time indicating an amount of time between the autonomous vehicle disconnecting from the first access point and connecting to any other access point of the plurality of access points.

19. The non-transitory computer-readable storage medium of claim 13, wherein the receiving, from the autonomous vehicle, of the network traffic information occurs at least one of periodically, randomly, upon request, upon a trigger event, or in real time.

20. The non-transitory computer-readable storage medium of claim 19, wherein the instructions further cause the computer system to perform operations comprising instructing the autonomous vehicle to transmit network traffic information based at least in part on a user request received from the user through the graphical user interface.

* * * * *